United States Patent [19]

Maki et al.

[11] Patent Number: 5,074,395
[45] Date of Patent: Dec. 24, 1991

[54] CLUTCH RELEASE APPARATUS

[75] Inventors: Naoyuki Maki, Hazu; Nobuyasu Ishida, Tokai; Tomohiro Saeki, Toyoake, all of Japan

[73] Assignee: Aisin Seiki Kabushiki Kaisha, Kariya, Japan

[21] Appl. No.: 472,868

[22] Filed: Jan. 31, 1990

[30] Foreign Application Priority Data

Jan. 31, 1989 [JP] Japan .................. 1-009268[U]

[51] Int. Cl.$^5$ ............................................ F16D 13/50
[52] U.S. Cl. ................... 192/70.27; 192/89 B
[58] Field of Search .............. 192/70.27, 70.28, 89 B

[56] References Cited

U.S. PATENT DOCUMENTS

| 4,602,708 | 7/1986 | Nagano | 192/89 B X |
| 4,641,736 | 2/1987 | Förster | 192/70.27 X |
| 4,830,162 | 5/1989 | Kuno | 192/89 B X |

FOREIGN PATENT DOCUMENTS

| 1255406 | 11/1967 | Fed. Rep. of Germany | 192/89 B |
| 3516152 | 6/1986 | Fed. Rep. of Germany | 192/89 B |
| 2546999 | 12/1984 | France | 192/89 B |

Primary Examiner—Allan D. Herrmann
Assistant Examiner—Andrea Pitts
Attorney, Agent, or Firm—Burns, Doane, Swecker & Mathis

[57] ABSTRACT

A clutch release arrangement for a clutch includes a pressure plate arranged in a clutch cover and having a fulcrum portion on its external circumference. A diaphragm spring is supported in the region of its external circumference to the clutch cover. The clutch is released by pressing the pressure plate in the direction of a clutch disk through the connection of the fulcrum portion of the pressure plate to the diaphragm spring. A return spring is arranged between the clutch cover and the diaphragm spring and in contact with the diaphragm spring, and the fulcrum portion is a continuously curved surface formed so that the height of the fulcrum portion is low in proportion to the distance between the fulcrum portion and a contact point.

1 Claim, 6 Drawing Sheets

CLUTCH RELEASE APPARATUS

BACKGROUND OF THE INVENTION

1. Field of the Invention

This invention relates to a clutch release apparatus for use in a motor vehicle, and in particular to a clutch release apparatus equipped with a diaphragm spring.

2. Description of the Related Art

A prior art clutch release apparatus is known from Japanese Utility Model Laid-Open Print No. 59-137422. This prior art shown in FIG. 11 discloses a clutch release apparatus equipped with a clutch release means for pressing a pressure plate 1 toward a clutch disc (not shown) by a plurality of coil springs 4 (only one is shown) each of which is between a clutch cover 5 and the pressure plate 1. A clutch facing 3 is provided between the pressure plate 1 and a flywheel 2 and the clutch facing 3 functions to transmit torque from the flywheel 2 to a shaft (not shown) fixed to the clutch facing 3. When the clutch release apparatus is not operated, the pressure plate 1 is pressed by each coil spring 4 to press the clutch facing 3 toward the flywheel 2 so that torque of the flywheel 2 is transmitted to the shaft to which the clutch facing 3 is fixed.

On the other hand, when the clutch release apparatus is operated, disengagement of the flywheel 2 from the clutch facing 3 is established due to the application of a force to the pressure plate 1 which overcomes the urging force of the plural springs 4 so as to prevent the transmission of torque from the flywheel 2 to the shaft to which the clutch facing 3 is attached.

However, in the foregoing clutch release apparatus, plural coil springs 4 have to be installed between the clutch cover 5 and the pressure plate 1 with the result that the axial length is increased and configuration of the clutch release apparatus becomes complex.

In light of the above-mentioned drawback, recently, a clutch release apparatus was proposed in which a diaphragm spring is employed instead of the conventional coil spring. This clutch release apparatus, as shown in FIG. 12, is equipped with a clutch cover 6, a diaphragm spring 7 supported by the clutch cover 6, a pressure plate 8 arranged in the clutch cover 6 and urged toward an output shaft (not shown) by the diaphragm spring 7. In this newly proposed clutch release apparatus, an outer peripheral portion 7a of the diaphragm spring 7 urges the pressure plate 8 toward the clutch disc by pressing against a fulcrum portion 8a of the pressure plate 8. The separation or disengagement of the pressure plate 8 from the clutch disc can be obtained by releasing the diaphragm 7 from its pressing engagement with the pressure plate 8. However, due to long-term use of the apparatus, the friction face of the pressure plate is subject to continual wear with the result that the point of contact between the diaphragm 7 and the pressure plate 8 is changed, thereby changing the clutch release characteristic. The foregoing is due to the shape of the support portion 8a being curved with a constant radial diameter R. Accordingly, the movement of the pressure plate 8 in the forward direction i.e., in the direction of the disc plate, increases the force required by a driver to depress a clutch pedal (not shown) and thereby release the clutch.

SUMMARY OF THE PRESENT INVENTION

It is an object of the present invention to provide a clutch release apparatus by which the force required to depress the clutch pedal can be decreased, even if the friction face of the pressure plate has been subjected to wear.

It is another object of the present invention to provide a clutch release apparatus with a constant load characteristic of the diaphragm spring.

BRIEF DESCRIPTION OF THE DRAWINGS

These and other objects, features and advantages of the present invention will become more apparent on reading the following detailed description with reference to the accompanying drawings, wherein like members bear like reference numerals, and wherein.

DETAILED DESCRIPTION OF A PREFERRED EMBODIMENT

Figure 1:
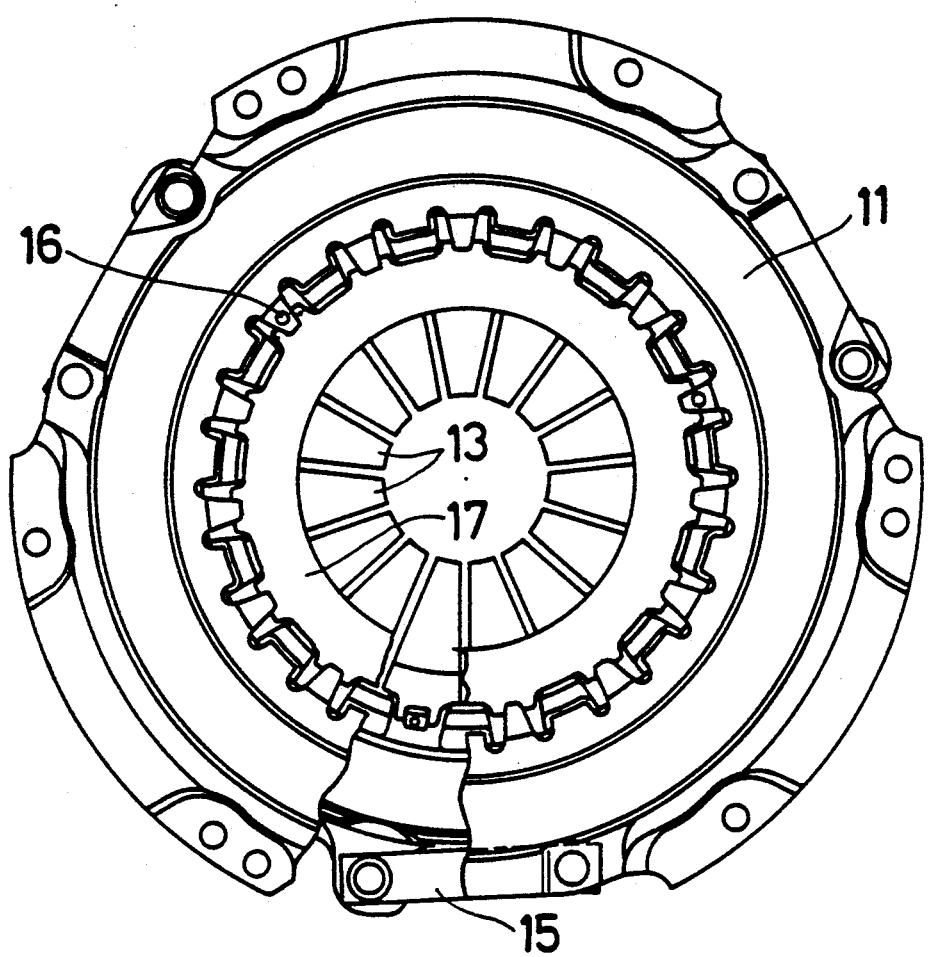
FIG. 1 is a plane view of a clutch release apparatus according to an embodiment of the present invention.
Figure 2:
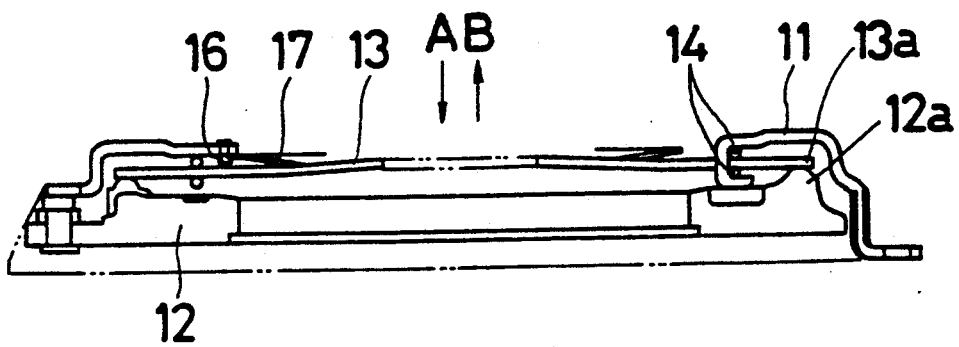
FIG. 2 is a lateral sectional view of a clutch release apparatus according to an embodiment of the present invention.

In a preferred embodiment of the clutch release apparatus shown in FIG. 1 and FIG. 2, numeral 11 indicates a clutch cover, numeral 12 indicates a pressure plate arranged in the clutch cover 11, numeral 13 indicates a diaphragm spring supported in a region of its external circumference axially to the clutch cover 11 by a pivot ring 14 and numeral 15 indicates a strap for urging the pressure plate 12 in a direction for the separation thereof from a clutch disc (not shown). Arrangement of these members is the same as in the conventional clutch release apparatus. Thus, an outer peripheral portion 13a of the diaphragm spring 13 is in contact with a fulcrum portion or projection 12a integrally formed on the external circumference of the pressure plate 12. As a result, the pressure plate 12 is urged in the direction of the clutch disc (not shown) due to movement of the pivot ring 14 about the fulcrum or projection 12a. When the driver depresses the clutch pedal (not shown), a release bearing (not shown) is moved in the direction of an arrow A and the diaphragm spring 13 acts as release lever when acted on by the bearing. The outer peripheral portion 13a is rotated about the pivot ring 14 so as to be moved away from the fulcrum portion 12a of the pressure plate 12. Therefore, the pressure plate 12 moves in the direction of arrow B after release from the diaphragm spring 13, thereby obtaining a clutch release condition in which the pressure plate 12 is disengaged from the clutch disc.

Figure 3:
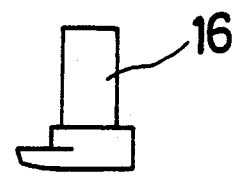
FIG. 3 is a sectional view of the shape of a rivet shown in FIG. 1.
Figure 4:
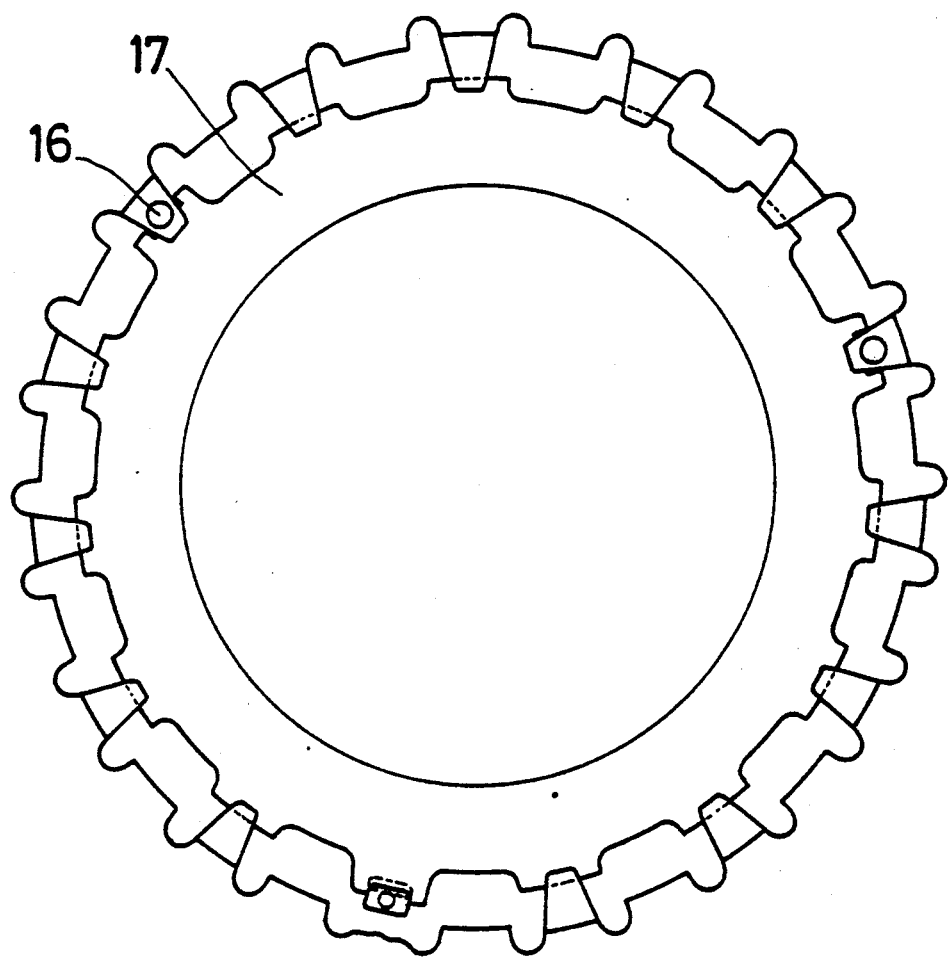
FIG. 4 is shows the assembled state of the clutch cover and the return spring.

A plurality of holes are provided in the inner peripheral portion of the clutch cover 11. A rivet 16 as shown in FIG. 3 is passed through the hole 4 and held therein by a well-known connecting method, i.e., caulking, and a distal end of the rivet 16 is engaged with a return spring 17 inside of the clutch cover 11 (FIGS. 2 through 4). Therefore, the return spring 17 is arranged between the clutch cover 11 and diaphragm spring 13 and is engaged with the diaphragm spring 13 as shown in FIG. 4.

Figure 5:
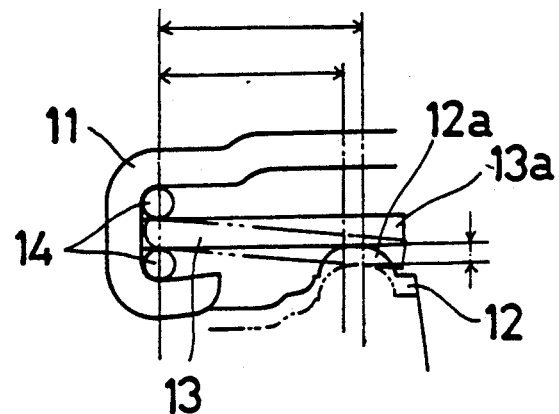
FIG. 5 is an enlarged sectional view showing the connection of the diaphragm spring and the pressure plate.
Figure 6:
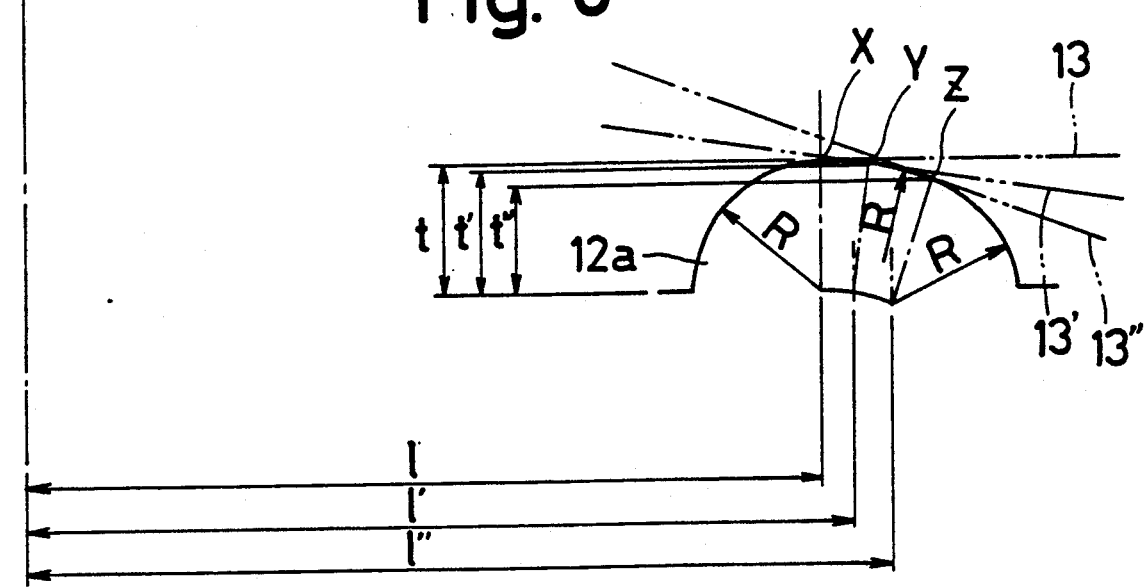
FIG. 6 is a lateral sectional view showing a fulcrum point of the pressure plate.

The surface of the fulcrum portion 12a of the pressure plate 12 is formed to be continuously curved as shown in FIG. 5. The outer peripheral portion 13a of the diaphragm spring 13 is in contact with the top of the fulcrum portion 12a. Further, as shown in FIG. 6, the height t of the fulcrum portion 12a is formed to be continuously lower as the distance l between a point of the fulcrum portion 12a and the center "O" of the pivot ring 14 increases. "X" indicates a point to be in contact with the diaphragm spring 13 before the first use of the apparatus, the height of the point X is t, and the distance between the point X and the center O of the pivot ring 14 is l. "Y" indicates a point in contact with the diaphragm spring 13' at a condition in which the friction surface of the pressure plate has been advanced to a degree due to wear. The height of point Y is t', and a distance between a point Y and the center O of the pivot ring 14 is l'. "Z" indicates a point in contact with the diaphragm spring 13' when wear of the friction surface of the pressure plate 12 is further increased. The height t of the point Z is t", and a distance between the point Z and the center O of the pivot ring 14 is l". With respect to these points X, Y and Z which are related to each other in connection with the fulcrum portion 12a, the following two relationships, $t>t'>t''$ and $l''>l'>$ are obtained.

Figure 7:
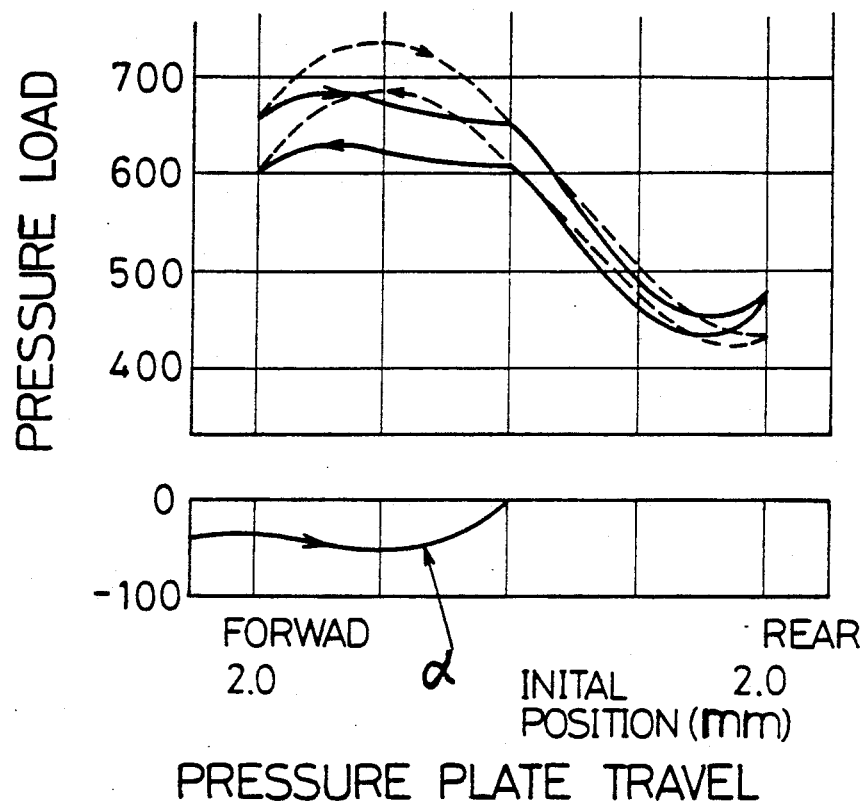
FIG. 7 is a graph of load characteristics of the diaphragm spring.
Figure 8:
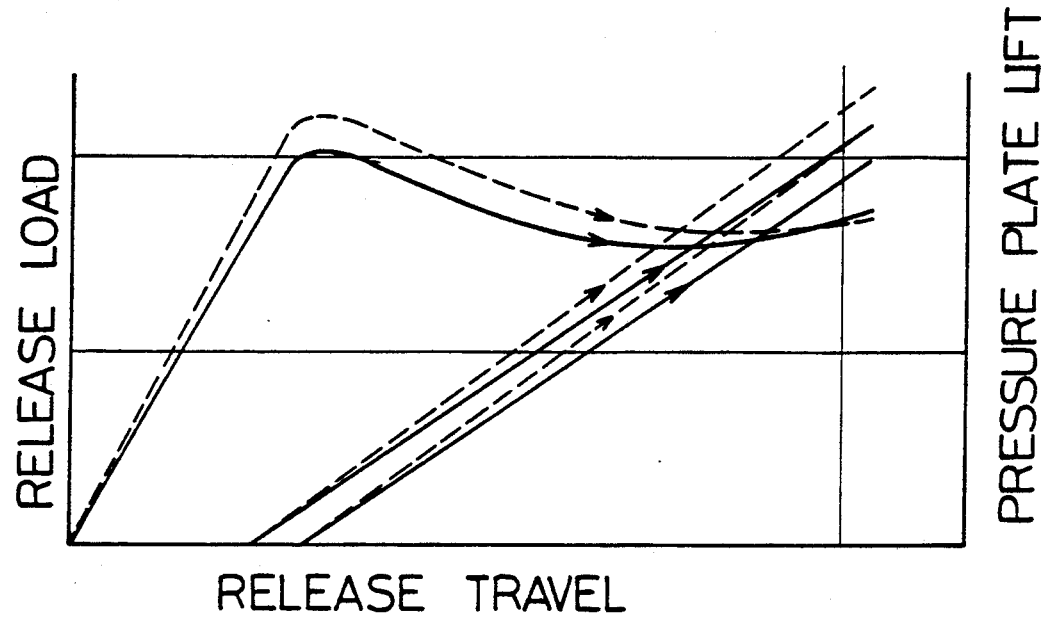
FIG. 8 is a graph of clutch release characteristics before use of the apparatus.
Figure 9:
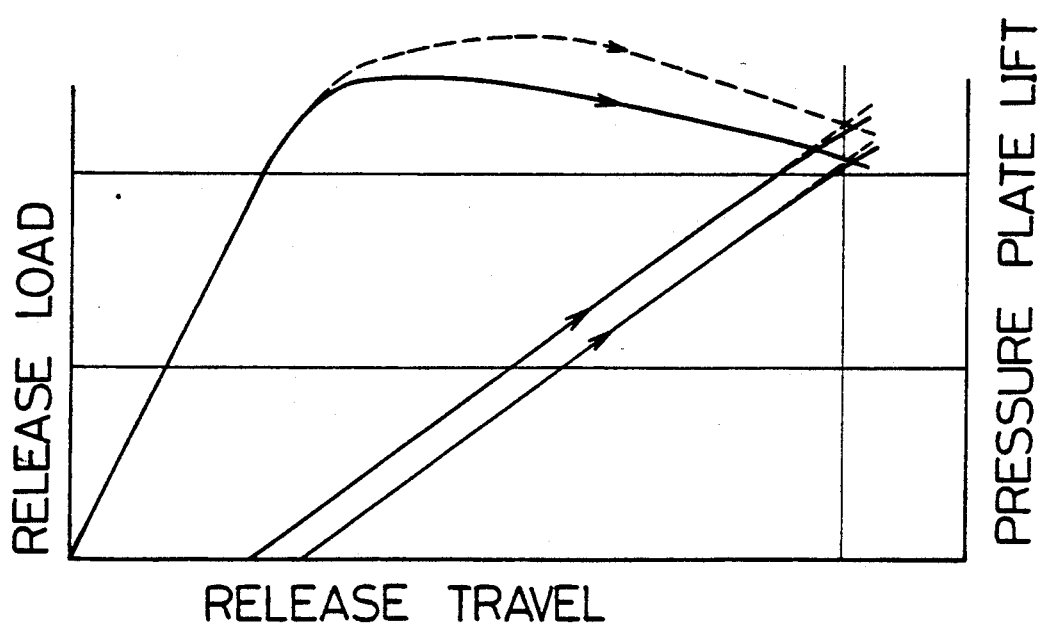
FIG. 9 is a graph of clutch release characteristics when the wear of the pressure plates is advanced at a degree.
Figure 11:
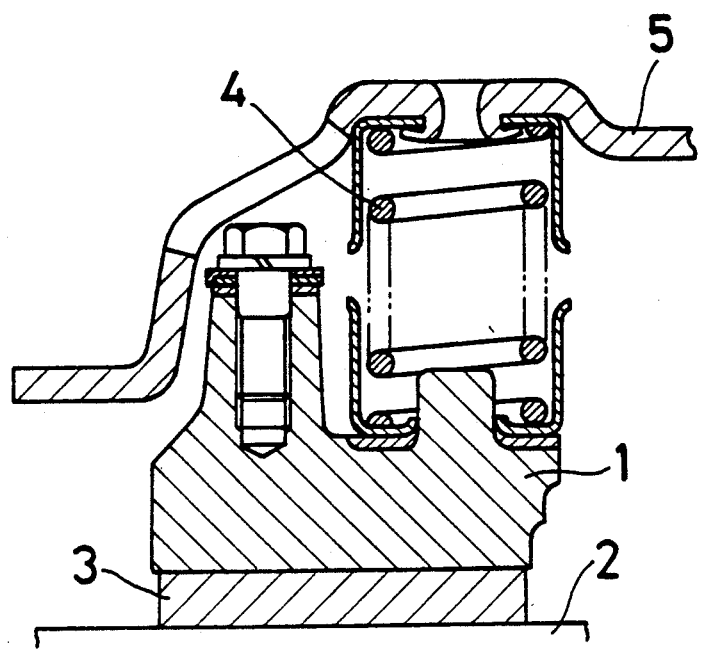
FIG. 11 and 12 show a conventional clutch release apparatus.

In each of FIGS. 7 through 9, a solid line indicates each characteristic of the clutch release apparatus according to the present invention and a dotted-line indicates each characteristic of the conventional clutch release apparatus. With reference to the load characteristic of the diaphragm spring 13, the pressure plate 12 moves toward the clutch disc (not shown) as wear of the friction surface of the pressure plate 12 increases, thereby transferring the position of the diaphragm spring 13 to 13' and 13" in turn. Thus, the return spring 17 has an increased load and the load of the diaphragm spring 13 is decreased an amount corresponding to the resulting increased load of the return spring 17. Consequently, as shown in FIG. 7, the load of the diaphragm is decreased in comparison with the conventional device in light of a 2 mm displacement of the pressure plate 12 in the forward direction of the vehicle body from an initial position or a position at which the pressure plate 12 is initially installed. In case of a 2.0 mm movement of the pressure plate 12 in the rearward direction of the vehicle-body upon release-operation, due to non-uniform configuration of the fulcrum portion 12a of the pressure plate 12, the span l between the fulcrum portion 12a and the center O of the pivot ring is increased to l, l' and l" in turn as shown in FIG. 6, thereby decreasing the load of the diaphragm spring 13 during movement of the pressure plate 12 from the initial position to a position spaced therefrom at a distance of 1.5 mm. It is noted that α represents the characteristic of the return spring.

In the present invention, the non-uniform configuration of the fulcrum portion 12a of the pressure plate 12 establishes, as apparent from FIG. 6, a shorter span l between the fulcrum portion 12a and the center O of the pivot ring in comparison with that of a worn pressure plate having a higher fulcrum portion 12a with a height of t. Thus, the conventional release characteristic can be obtained by using a diaphragm spring 13 with a lower load and a release peak load can be restricted to a lower value.

The release characteristic of the pressure plate having the worn condition of 2.00 mm in the frontward direction is decreased as shown in the solid line in FIG. 9 since the load characteristic of the diaphragm spring 13 is decreased by the reaction of the return spring 17 shown in FIG. 7. Thus, the force to be applied to the foot-pedal for operating the clutch can be reduced and the graph of the release load characteristic is a smooth curve.

Figure 10:
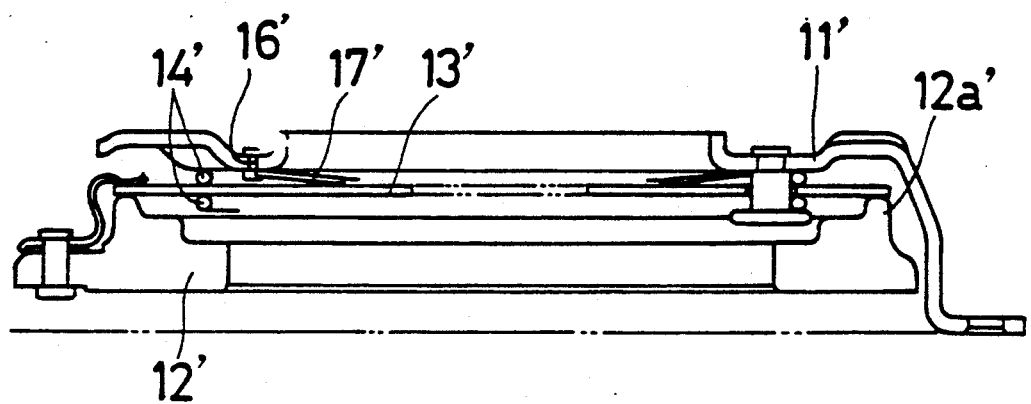
FIG. 10 is a lateral sectional view of a clutch release apparatus according to another embodiment of the present invention.
Figure 12:
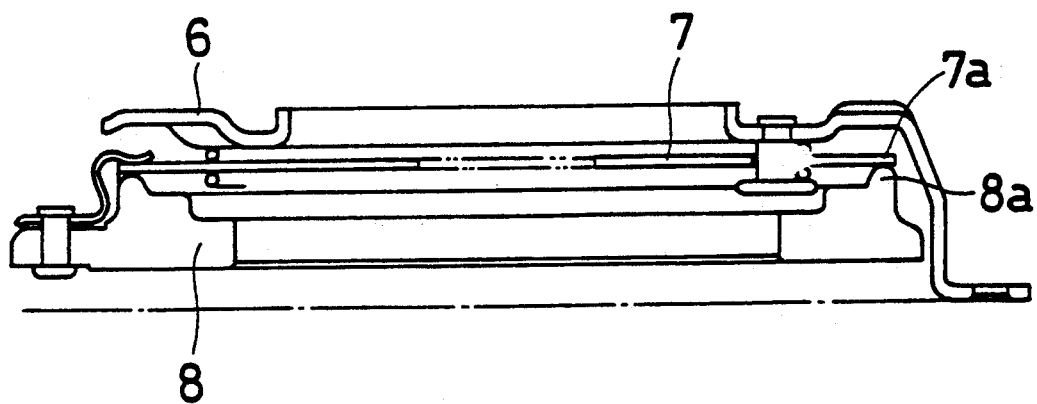

In another embodiment, a set rivet clutch release apparatus is shown in FIG. 10 wherein numeral 11' indicates the clutch cover, numeral 12' indicates the pressure plate, numeral 13' indicates the diaphragm spring, numeral 14' indicates the pivot ring, numeral 16' indicates the rivet, numeral 17' indicates the return spring, and the shape of the fulcrum portion 12a of the pressure plate 12 is formed as shown in FIG. 6. The embodiment of FIG. 10 is a set rivet type clutch similar to that shown in FIG. 12. However, the conventional type set rivet clutch, shown in FIG. 12, is not provided with a fulcrum or projection portion 12a which is contoured in the manner of the present invention. Accordingly, FIG. 10 shows a fulcrum or projection 12a' which is provided with the contour of the embodiment of FIG. 1. Accordingly, the contoured arrangement of the fulcrum portion 12a' permits the force required to release the clutch to be maintained at a lower level in the same manner as that in the embodiment of FIG. 2.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention a set forth in the appended claims.

What is claimed is:

1. A clutch release apparatus comprising:
    a pressure plate arranged in a clutch cover and having an external circumference with a fulcrum portion defined thereon, said fulcrum portion having a plurality of fulcrum points;
    a pivot ring;
    a diaphragm spring having an external circumference and supported at a region of the external circumference to the clutch cover by said pivot ring;
    clutch release means for releasing the clutch by pressing the pressure plate toward a clutch disc of the clutch by contact between the fulcrum portion of the pressure plate with a diaphragm spring; and
    a return spring arranged between the clutch cover and the diaphragm spring, the fulcrum portion being a continuously curved surface whereby a different one of said plurality of fulcrum points is selected by said contact as said pressure plate wears so that the height of the fulcrum portion decreases in proportion to an increase of the distance between the fulcrum portion and a contact point defined at the pivot ring center.

* * * * *